UNITED STATES PATENT OFFICE 2,551,894

MORDANT AZO-DYESTUFFS

Max Müller, Basel, and Jörg Ostertag, Riehen, near Basel, Switzerland, assignors to Durand & Huguenin A. G., Basel, Switzerland, a Swiss firm No Drawing. Application December 14, 1949, Serial No. 132,988. In Switzerland December 15, 1948

4 Claims. (Cl. 260—143)

According to this invention, valuable new mordant azo dyestuffs are made by condensing a nitro-monoazo dyestuff which corresponds to the formula

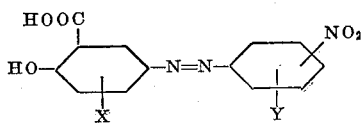

wherein X represents hydrogen or a lower alkyl radical and Y represents hydrogen or $SO_3H$, in an alkaline medium with an amino-aryl ketone which corresponds to the formula

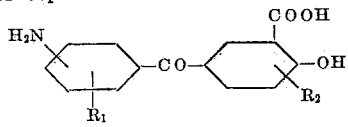

wherein $R_1$ stands for hydrogen, $SO_3H$ or halogen, and $R_2$ stands for hydrogen or $SO_3H$.

The amino-diaryl ketones may be obtained, for example, by the Friedel-Crafts reaction by condensing a nitro-substituted carboxylic acid halide with an alkyl ester of an aromatic ortho-hydroxy-carboxylic acid, hydrolysing the resulting ester, and reducing the nitro-group in the product to a free amino group (compare Limprich, Annalen der Chemie, vol. 290, page 170).

The new dyestuffs obtainable by the above process correspond to the formula

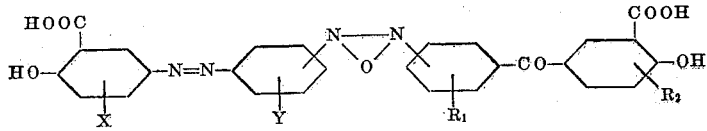

and are especially suitable for chrome printing on cellulose fibres, whereby there are produced principally orange to brown prints which are distinguished by excellent properties of wet fastness and also fastness to chlorine and light. The new dyestuffs are also suitable for dyeing protective oxide coatings on aluminium and its alloys, whereby there are produced principally golden tints having excellent properties of fastness.

The following examples illustrate the invention, the parts being by weight:

Example 1

36.7 parts of 4-nitro-4'-hydroxy-3'-carboxy-1:1'-azobenzene-3-sulphonic acid and 25.7 parts of 1-(4'-amino - benzoyl) - 4 - hydroxybenzene - 3-carboxylic acid are heated with 400 parts of caustic soda solution of about 8 per cent strength for 15 hours at the boil under reflux. The excess of alkali is then neutralised with hydrochloric acid until the reaction is feebly alkaline, the whole is allowed to cool, and the precipitated condensation product is isolated.

The new azo dyestuff which corresponds to the formula

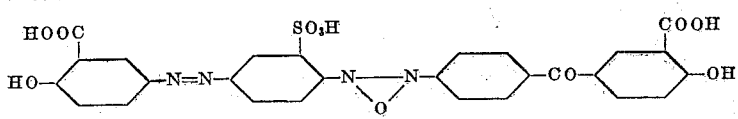

dissolves in water with an orange colouration and in concentrated sulphuric acid with a reddish-blue colouration. In chrome printing on cotton it yields strong orange prints which are distinguished by excellent properties of wet fastness, and also fastness to chlorine and light.

A dyestuff having similar properties is obtained by using, instead of 1-(4'-aminobenzoyl) - 4 - hydroxybenzene - 3 - carboxylic acid, 1 - (4' - aminobenzoyl) - 4 - hydroxybenzene - 3 - carboxylic acid-5-sulphonic acid. The dyestuff so obtained dyes, for example, anodically oxidised aluminium golden tints having very good properties of fastness.

Example 2

36.7 parts of 4-nitro-4'-hydroxy-3'-carboxy-

1:1'-azobenzene-2-sulphonic acid and 33.7 parts of 1-(4'-aminobenzoyl) - 4 - hydroxybenzene - 3 - carboxylic acid-5-sulphonic acid are heated with 400 parts of caustic soda solution of about 8 per cent strength for 15 hours at the boil under reflux. The excess of alkali is then neutralised with hydrochloric acid until the reaction is feebly alkaline, the whole is allowed to cool and the precipitated condensation product is isolated.

The new azo dyestuff which corresponds to the formula

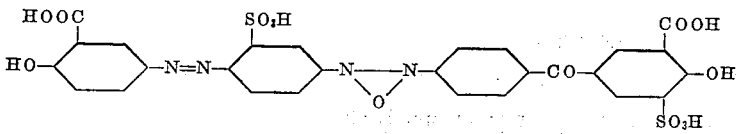

dissolves in water with an orange colouration and in concentrated sulphuric acid with a blue-violet colouration. In chrome printing on cotton it yields orange-brown prints which are distinguished by excellent properties of wet fastness, and also fastness to chlorine and light.

Dyestuffs having similar properties are obtained by using instead of 1-(4'-aminobenzoyl)-4-hydroxybenzene-3-carboxylic acid-5-sulphonic acid, 1-(4'-aminobenzoyl-3'-sulphonic acid)-4-hydroxybenzene-3-carboxylic acid or 1-(4'-aminobenzoyl-3'-sulphonic acid)-4-hydroxybenzene-3-carboxylic acid-5-sulphonic acid.

*Example 3*

36.7 parts of 3-nitro-4'-hydroxy-3'-carboxy-1:1'-azobenzene-4-sulphonic acid and 25.7 parts of 1-(4'-aminobenzoyl) - 4 - hydroxybenzene - 3 - carboxylic acid are heated with 400 parts of caustic soda solution of about 8 per cent strength for 20–24 hours at the boil under reflux. The excess of alkali is then neutralised with hydrochloric acid until the reaction is feebly alkaline, the whole is allowed to cool, and the precipitated condensation product is isolated.

The new dyestuff dissolves in water with an orange colouration and in concentrated sulphuric acid with a yellowish-brown colouration. In chrome printing on cotton the dyestuff yields yellowish orange-brown prints which are in part distinguished by excellent properties of wet fastness, and also fastness to chlorine and light.

By using 3-nitro-4'-hydroxy-3'-carboxy-1:1'-azobenzene-6-sulphonic acid, instead of 3-nitro-4' - hydroxy - 3' - carboxy - 1:1' - azobenzene - 4-sulphonic acid, there is obtained a dyestuff having similar properties.

*Example 4*

38.1 parts of 4-nitro-5'-methyl-4'-hydroxy-3'-carboxy-1:1'-azobenzene-2-sulphonic acid and 25.7 parts of 1-(4'-aminobenzoyl)-4-hydroxybenzene-3-carboxylic acid are heated with 400 parts of caustic soda solution of about 6 per cent strength for 10 hours at the boil under reflux. The excess of alkali is neutralised with hydrochloric acid until the reaction is feebly alkaline, the whole is allowed to cool and the precipitated condensation product is isolated.

The new dyestuff dissolves in water with a red-orange colouration and in concentrated sulphuric acid with a blue colouration. In chrome printing on cotton it yields strong red-brown prints, which are distinguished by excellent properties of wet fastness, and also fastness to chlorine and light.

By using 4-nitro-6'-methyl-4'-hydroxy-3'-carboxy-1:1'-azobenzene-2-sulphonic acid, instead of 4-nitro-5'-methyl-4'-hydroxy-3'-carboxy-1:1'-azobenzene-2-sulphonic acid, a dyestuff having similar properties is obtained.

*Example 5*

36.7 parts of 4-nitro-4'-hydroxy-3'-carboxy-1:1'-azobenzene-2-sulphonic acid and 25.7 parts of 1-(3'-aminobenzoyl) - 4 - hydroxybenzene - 3 - carboxylic acid are heated with 1000 parts of caustic soda solution of about 8 per cent strength for 20 hours at the boil under reflux. The excess of alkali is neutralised with hydrochloric acid until the reaction is feebly alkaline, and the condensation product is isolated by salting out.

The new azo dyestuff which corresponds to the formula

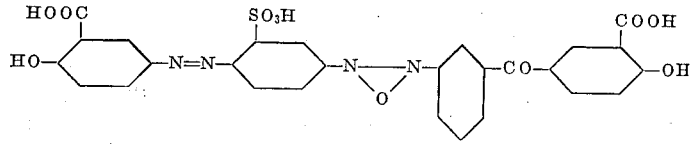

dissolves in water with an orange colouration and in concentrated sulphuric acid with a violet colouration. In chrome printing on cotton it yields strong orange-brown prints which are distinguished by excellent properties of wet fastness and fastness to chlorine and light.

Dyestuffs having similar properties are obtained by using instead of 1-(3'-aminobenzoyl)-4-hydroxybenzene-3-carboxylic acid, 1-(3'-aminobenzoyl)-4-hydroxybenzene-3-carboxylic acid-5-sulphonic acid, or 1-(3'-aminobenzoyl-4'-sulphonic acid) - 4 - hydroxybenzene - 3 - carboxylic acid, or 1-(4'-chloro-3'-aminobenzoyl)-4-hydroxybenzene-3-carboxylic acid.

*Example 6*

30.9 parts of 4-nitro-4'-hydroxy-3'-carboxy-1:1'-azobenzene in the form of the sodium salt and 33.7 parts of 1-(4'-aminobenzoyl)-4-hydroxybenzene-3-carboxylic acid-5-sulphonic acid are heated with 600 parts of caustic soda solution of about 8 per cent strength for 20 hours at the boil under reflux. After cooling, the excess of alkali is neutralised with hydrochloric acid until the reaction is feebly alkaline and the precipitated condensation product is isolated.

The new dyestuff dissolves in water with an orange colouration and in concentrated sulphuric acid with a blue-violet colouration. In chrome printing on cotton it yields orange prints which in part have very good properties of wet fastness and also fastness to chlorine and light.

By using, instead of 4-nitro-4'-hydroxy-3'-carboxy-1:1'-azobenzene, 4-nitro-5'-methyl-4'-hydroxy-3'-carboxy-1:1'-azobenzene or 4-nitro-4'-hydroxy-3'-carboxy-5'-sulphonic acid -1:1'-azobenzene there are obtained dyestuffs having similar properties.

We claim:
1. The azo dyestuffs of the general formula

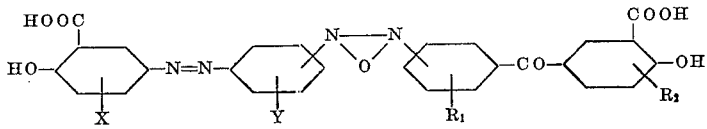

wherein X means a member selected from the group consisting of hydrogen and lower alkyl radicals, Y means a member selected from the group consisting of hydrogen and $SO_3H$, $R_1$ means a member selected from the group consisting of hydrogen, $SO_3H$ and halogen and $R_2$ means a member selected from the group consisting of hydrogen and $SO_3H$, being orange to brown powders, dissolving in water with orange to brown colouration and dyeing cellulosic fibres in the chrome-printing process orange to brown shades.

2. The azo dyestuff of the formula

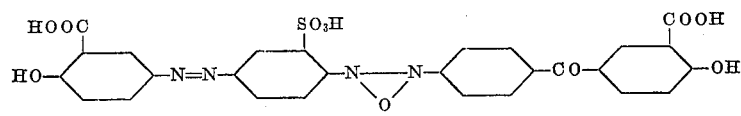

being a red-brown powder, dissolving in water with an orange colouration and dyeing cellulosic fibres in the chrome-printing process orange shades.

3. The azo dyestuff of the formula

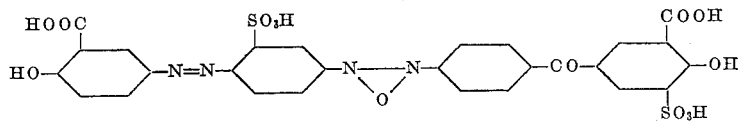

being a red-brown powder, dissolving in water with an orange colouration and dyeing cellulosic fibres in the chrome-printing process orange-brown shades.

4. The azo dyestuff of the formula

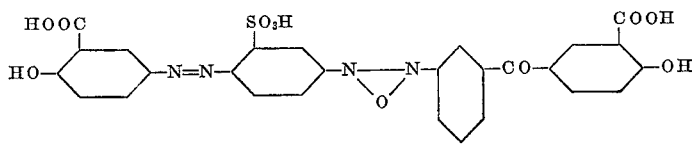

being a red-brown powder, dissolving in water with an orange colouration and dyeing cellulosic fibres in the chrome-printing process orange-brown shades.

MAX MÜLLER.
JÖRG OSTERTAG.

REFERENCES CITED

The following references are of record in the file of this patent:

UNITED STATES PATENTS

| Number | Name | Date |
|---|---|---|
| 406,670 | Sandmeyer | July 9, 1889 |
| 613,911 | Ris | Nov. 8, 1898 |
| 1,552,058 | Kalischer et al. | Sept. 1, 1925 |
| 2,466,245 | Keller | Apr. 5, 1949 |